US009049251B2

(12) United States Patent
Ravindran et al.

(10) Patent No.: US 9,049,251 B2
(45) Date of Patent: Jun. 2, 2015

(54) METHOD AND APPARATUS FOR INTERNET PROTOCOL BASED CONTENT ROUTER

(75) Inventors: Ravishankar Ravindran, San Jose, CA (US); Guo-Qiang Wang, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 341 days.

(21) Appl. No.: 13/589,530

(22) Filed: Aug. 20, 2012

(65) Prior Publication Data
US 2013/0227166 A1 Aug. 29, 2013

Related U.S. Application Data

(60) Provisional application No. 61/604,056, filed on Feb. 28, 2012.

(51) Int. Cl.
*G06F 15/173* (2006.01)
*H04L 29/08* (2006.01)
*H04L 29/06* (2006.01)
*H04L 12/715* (2013.01)
*H04L 12/741* (2013.01)

(52) U.S. Cl.
CPC ............ *H04L 67/327* (2013.01); *H04L 69/161* (2013.01); *H04L 45/74* (2013.01); *H04L 45/04* (2013.01); *H04L 67/2842* (2013.01); *H04L 67/2833* (2013.01)

(58) Field of Classification Search
CPC . H04L 67/161; H04L 67/327; H04L 67/2842; H04L 45/04; H04L 45/74; H04L 69/161
See application file for complete search history.

(56) References Cited

U.S. PATENT DOCUMENTS

| 7,840,696 | B2* | 11/2010 | Horgan | 709/236 |
| 8,619,777 | B2* | 12/2013 | Shah | 370/390 |
| 2001/0052011 | A1* | 12/2001 | Nagao | 709/224 |
| 2002/0071433 | A1* | 6/2002 | Tsuruoka et al. | 370/389 |
| 2003/0214948 | A1* | 11/2003 | Jin et al. | 370/392 |
| 2004/0158872 | A1 | 8/2004 | Kobayashi | |
| 2010/0034089 | A1 | 2/2010 | Kovvali et al. | |
| 2011/0038259 | A1* | 2/2011 | Bharrat et al. | 370/230 |

OTHER PUBLICATIONS

Popa, Lucian, et al., "HTTP as the Narrow Waist of the Future Internet," Proceedings of the 9th ACM SIGCOMM Workshop on Hot Topics in Networks, Article No. 6, Hotnets '10, Oct. 20-21, 2010, 6 pages.
Jacobsen, V., et al., "Networking Named Content," CoNEXT 2009, Dec. 2009, 13 pages.

(Continued)

*Primary Examiner* — Thomas Dailey
(74) *Attorney, Agent, or Firm* — Conley Rose, P.C.; Grant Rodolph; Brandt D. Howell

(57) ABSTRACT

An internet protocol (IP) content router, comprising a forwarding information base (FIB) engine comprising a data store comprising forwarding instructions, an IP packet classifier comprising a processor configured to classify a first incoming IP packet as an information centric networking (ICN) packet and a second incoming IP packet as a non-ICN packet, and an IP packet processor comprising a processor, wherein the IP packet processor is coupled to the FIB engine and to the IP packet classifier, wherein the IP packet processor is configured to intercept the ICN packet for further ICN processing in the IP content router, consult the FIB engine for forwarding instructions for the non-ICN packet, and forward the non-ICN packet according to the forwarding instructions.

20 Claims, 7 Drawing Sheets

(56) References Cited

OTHER PUBLICATIONS

Nichols, K., et al., "Definition of the Differentiated Services Field (DS Field) in the IPv4 and IPv6 Headers," IETF Network Working Group, RFC 2474, Dec. 1998, 20 pages.

Jacobson, V., "Networking Named Content," Conext '09 Proceedings of the 5th International Conference on Emerging Networking Experiments and Technologies, XP-002660911, Rome, Italy, Dec. 1-4, 2009, 12 pages.

Foreign Communication From a Counterpart Application, PCT Application PCT/US2013/026924, International Search Report dated May 22, 2013, 5 pages.

Foreign Communication From a Counterpart Application, PCT Application PCT/US2013/026924, Written Opinion dated May 22, 2013, 8 pages.

* cited by examiner

METHOD AND APPARATUS FOR INTERNET PROTOCOL BASED CONTENT ROUTER

CROSS-REFERENCE TO RELATED APPLICATIONS

The present application claims the benefit of U.S. Provisional Patent Application No. 61/604,056 filed Feb. 28, 2012 by Ravishankar Ravindran, et al. and entitled "Method and Apparatus for Internet Protocol Based Content Router," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Internet Protocol (IP) forwarding is based on host-to-host communication principle, i.e., the communication is assumed to take place between two static end points. IP forwarding is sender-oriented, i.e., the receiver has no control of specifying the properties related to the information it desires, for example, content version, publisher, etc. Also, knowing the location of the users allows a vicious sender to spam them with unwanted content. Today, IP routers do not support applications seeking popular content that can be efficiently delivered using content multicasting technique such as in-network caching, nor are network functions such as mobility and security supported efficiently. Considering the growth in user driven multimedia content today, Content Distribution Network (CDN) has been developed to support content distribution. However, CDN is a technology overlaid over IP and is application specific.

As an alternative approach, Information-Centric Networking (ICN) research addresses these issues by shifting the communication paradigm from a host-to-host model to a host-to-content model. In this case, user requirements are translated into packet data units that contain the name of the information sought with associated metadata. A router, upon receiving such a query, resolves it to itself if it has a cached copy of the data or forwards it along the direction where the content can be obtained. In addition, all the ICN solutions have inherent support for mobility and security. One of the drawbacks of the ICN proposal and of CDN as of today is that they are either clean-slate, which replaces IP protocol stacks, or require introducing new overlaid proprietary protocol (such as implementing Distributed Hash Table (DHT) or Domain Name System (DNS) redirection) in the provider's domain. Both of these approaches are prone to high Capital Expense (CAPEX) and Operational Expense (OPEX) as initial investment by the provider, which causes delay in implementing these solutions that aim to improve network efficiency and that may also reduce overall operating cost for the provider.

SUMMARY

In one embodiment, the disclosure includes an internet protocol (IP) content router, comprising a forwarding information base (FIB) engine comprising a data store comprising forwarding instructions, an IP packet classifier comprising a processor configured to classify a first incoming IP packet as an information centric networking (ICN) packet and a second incoming IP packet as a non-ICN packet, and an IP packet processor comprising a processor, wherein the IP packet processor is coupled to the FIB engine and to the IP packet classifier, wherein the IP packet processor is configured to intercept the ICN packet for further ICN processing in the IP content router, consult the FIB engine for forwarding instructions for the non-ICN packet, and forward the non-ICN packet according to the forwarding instructions.

In another embodiment, the disclosure includes a method for forwarding packets in a network, comprising receiving at a router an internet protocol (IP) packet from a network node, determining with a processor a classification of the IP packet, wherein the classification comprises one of an information centric networking (ICN) packet and a non-ICN packet, and performing application protocol level processing on the data packet if the data packet is determined to be an ICN packet.

In another embodiment, the disclosure includes an apparatus for routing information centric networking (ICN) content in an internet protocol (IP) based networking environment, comprising a plurality of interfaces, an internet protocol (IP) packet classifier coupled to the interfaces, wherein the IP packet classifier is configured to identify IP interest (IP-I) packets and IP content (IP-C) packets from incoming IP traffic on the plurality of interfaces, an IP protocol classifier coupled to the IP packet classifier, wherein the IP protocol classifier is configured to classify the IP-I packets and the IP-C packets based on an identity of one of a plurality of session level protocols, and a plurality of application processing engines (APEs) coupled to the IP protocol classifier, wherein each of the APEs corresponds to a corresponding session level protocol, wherein each of the APEs is configured to interpret a name in an IP-I packet to deliver services such as redirect a request to a new locator if the targeting content/service location has been changed due to mobility (i.e., a late-binding), respond to a request for content if the content is contained within an application content store, store content from the IP-C packet in the application content store, and index the content from the IP-C packet in the application content store based on a name of the IP-C packet.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
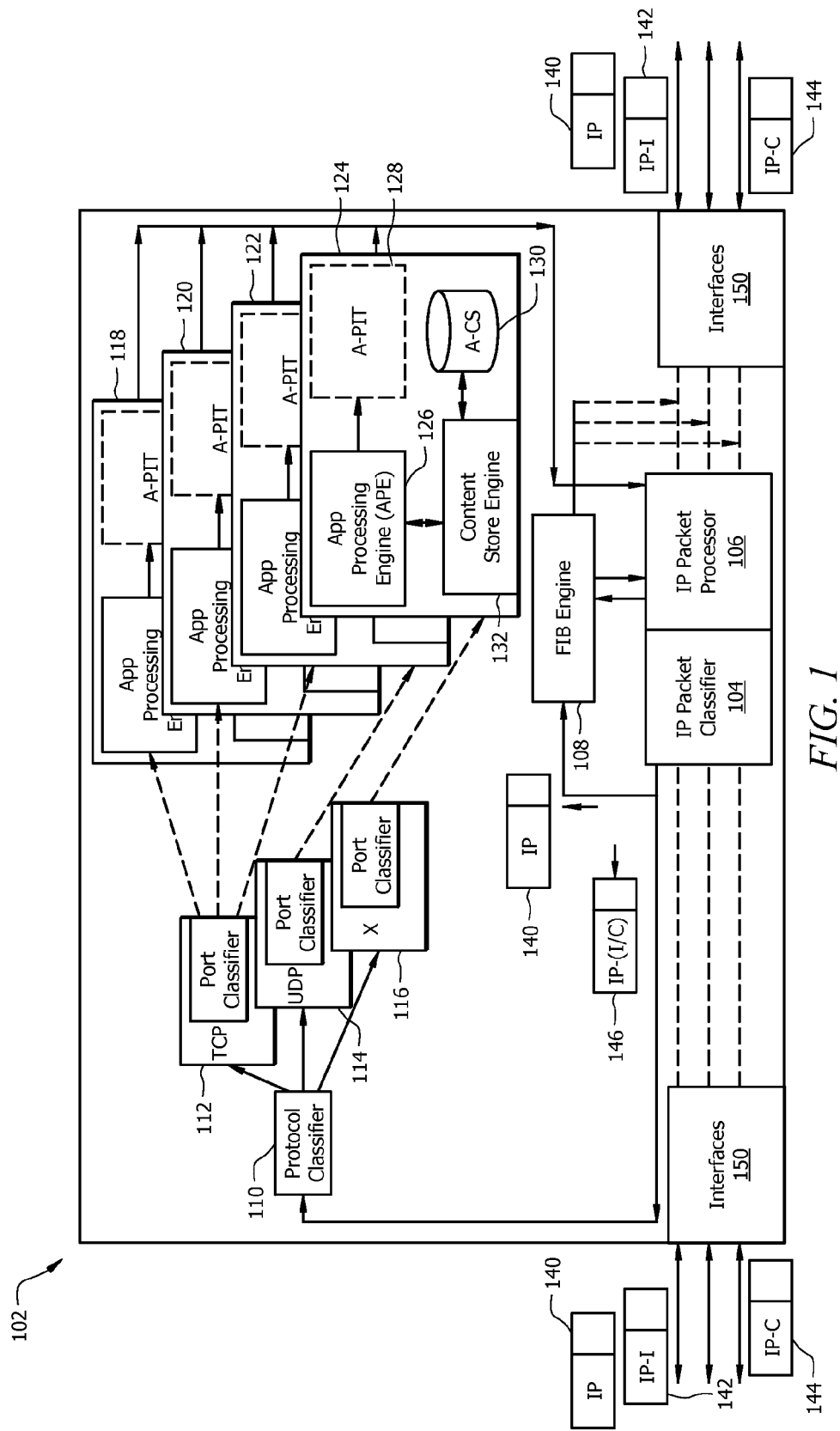
FIG. 1 is a block diagram of an IP based content router (IP-CR) according to an embodiment.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The Internet currently works by resolving the content name to a domain and then to a host IP address, where the content is originally stored. A flaw with this methodology is that, irrespective of whether the same content has been requested earlier, the content has to be re-fetched. The idea of re-fetching the content is inefficient both in terms of network efficiency (i.e., in terms of router and link capacity usage), and of economics, particularly for the lower tier providers who pay the higher tier operators to connect them to the Internet. Also, the content serving server may also be prone to an overload scenario with a possibility of a single point of failure exists as the content serving server may be required to scale to serve millions of users seeking the same information repeatedly. Solutions, such as CDN, address this problem by an overlaid distributed content caching infrastructure. In addition to off-loading the original server, a CDN tries to resolve user requests to the closest overlaid cache point, which improves the latency of obtaining the content. Though CDN alleviates the service providers' (SPs') problems by improving their network efficiency, CDN harms SPs economically because the CDN origin data is delivered over SP's infrastructure for no cost to the CDN. Also, the distributed optimization of their overlaid caches could cause instability in the underlying SP's network because the underlay is completely oblivious of their end optimization objectives.

ICN decouples content from hosts by basing the internetworking layer on names and not on content server locations. ICN proposals are PULL driven models, in that the users explicitly request (e.g., express an interest in) the content they are looking for, and the network is assumed to have the intelligence to route the request to the closest location. The backbone of an ICN network is a content router. A content router is a content aware router with caching and computing resources. The combination of the PULL driven model with the content routers that can memorize the content flowing through the router addresses many flaws with IP today. For example, the caching feature enables content multicasting, and addresses the problem of not re-fetching the content once the network has seen the content due to an earlier user's actions. Since the content names are persistent in the ICN framework, the same content can be retrieved from the closest content router by expressing an interest with the same name. In addition, ICN addresses the problem of mobility by leveraging the in-network caching feature and re-expressing an interest after a blackout period encountered during a handoff. Security is enabled by making every content chunk self-verifiable by the receiver irrespective of where it is received.

ICN solutions can be deployed in one of three ways. The first method is an overlay model, which is an incremental approach and practical. It involves placing ICN routers at the boundary of a domain. The underlay here could be any deployed Level 3 (L3) technology, such as IP, any Level 2 (L2) technology, such as Ethernet, or some other protocol, such as Multiprotocol Label Switching (MPLS). Here, while with this deployment one cannot realize the full efficiency gain of an ICN, the ICN would perform better than current networks in terms of content delivery efficiency. One of the management tasks for the provider is to deploy and manage new network elements (both user terminals and network equipment) involving new protocols, and over and above, learn to tune the new network equipment (NEs) to achieve maximum efficiency.

The second approach is an integrated model, which leverages known protocols such as IP/Hypertext Transfer Protocol (HTTP) to enable features desired in an ICN architecture. This approach minimizes the cost of realizing new network functions both in terms of CAPEX and OPEX. Capital expenses would be less because such features could be potentially realized using software upgrades to existing network elements without replacing IP protocol stacks in both terminals and routers. One of the proposals in the literature today is to use HTTP as the narrow waist. However, a few issues with this are: 1) there is an assumption that HTTP is the only protocol used for content delivery (Real-time Transport Protocol (RTP) is another popular protocol of choice for Internet Protocol Television (IPTv) application); 2) using HTTP overrides the simplicity IP provides for host-to-host applications, which now has to be mapped to an HTTP semantic, such as, a Subscriber-Get (S-GET) proposed by Popa. Additional details regarding this are discussed in Lucian Popa et al, "HTTP As a Narrow Waist for Future Internet", Hot-ICE 2011, which is incorporated hereing by reference as if reproduced in its entirety.

The third approach is the clean-slate approach, which is the most disruptive since this approach involves swapping the current technology. New hardware and software must be deployed with the new solutions in this approach. Furthermore, the clean-state approach is also the most expensive approach.

Disclosed herein are systems, apparatuses, and methods for bridging the gap between what IP does today and what ICN tries to achieve by enabling some of the ICN features in IP. Routers that support these features are referred to herein as IP Content Routers (IP-CRs). IP-CRs may be a traditional IP router except that they carry out the new functions that are disclosed herein. As these features are built over IP, the benefits of the enhancements proposed in this disclosure may be immediately realizable with certain software updates and re-purposing the caching ability in IP routers today, and increasing the cache size if necessary. The systems, apparatuses, and methods do not require any new protocols other than what exists today. Hence, cost to operationalize these features may be minimal.

In an embodiment, IP packets may comprises a field that indicates whether the packet is a traditional IP packet, an IP-interest packet (i.e., an IP packet comprising a ICN interest or request for content), or an IP-content packet (i.e., an IP packet comprising ICN content). In an embodiment, if the IP packet is a traditional IP packet, then the IP-CR processes the packet normally (e.g., according to well-known IP processing methods). However, if the IP packet is an IP-interest packet or an IP-content packet, then the packet is intercepted for additional processing. The additional processing may include retrieving the content from a local data store and returning the content to the requesting client without forwarding the request to a server from which the content may have originated. In an embodiment, content in a IP-content packet may be cached in a local data store of the IP-CR such that the IP-content packet may be retrieved and provided to other users without having to refetch the content from the IP-content packet's originating server. Thus, the disclosed IP-CR may route both traditional IP packets not configured to support information centric networking and ICN data through an IP based network.

The disclosed methods, systems, and apparatuses may provide one or more of the following benefits. The disclosed methods, systems, and apparatuses may enable IP to operate in a PULL mode, so that applications can express an 'interest' protocol data unit (PDU) with an explicit content name and associated properties that would allow the network to resolve it to a topologically closer location. The disclosed methods, systems, and apparatuses may provide for using 'content' PDU to make IP amenable to caching content so that content from the network can be cached dynamically, retrieved at will, thus enabling content multicasting feature in the network. The disclosed methods, systems, and apparatuses may enable aggregation of user requests allowing dynamic construction of multicast tree to enable efficient content delivery. The disclosed methods, systems, and apparatuses may allow the IP layer to support both point-to-point applications with non-shareable characteristics and content consuming and distribution applications in the network, which are inherently shareable. The disclosed methods, systems, and apparatuses may provide a solution that can be realized over current IP networks (e.g., the Internet) with minimal upgrades existing IP infrastructure. The disclosed methods, systems, and apparatuses may work for both connectionless and connection-oriented session layer protocols, e.g. user data gram/transfer connect protocol (UDP/TCP). The disclosed methods, systems, and apparatuses may enforce various level of security over the content that is disseminated within the IP domain.

Disclosed herein are two extensions to IP. The first extension may allow applications to indicate to the IP layer that the PDU expressed is an interest for content. The second extension may indicate that the IP PDU comprises a content object. The interest IP packet (IP-I) may be interpreted by an IP content router (IP-CR) as an interest to search for a content object. IP-I may mimic the PULL model in HTTP. The content IP packet (IP-C) may be interpreted as a response packet containing a content object that can be potentially cached in the network. In effect a single bit in the IP packet may mark the two types of packets. From the perspective of encoding this information in an IP header, there may be several approaches to achieve this.

One approach is to use differentiated services code point (DSCP) bits. In a way, IP-(I/C) PDUs represent a different class of traffic that has to be differentiated in a router and processed differently. Bits 8-13 of the header of the IP packet are used to indicate the DSCP code point, Request For Comment (RFC) 2747 defines three pools of this bit space. RFC 2747, "Definition of the Differentiated Services Field (DS Field) in the IPv4 and IPv6 Headers" is incorporated herein by reference as if reproduced in its entirety. Pool 3 has been identified for future standardization, and the pool 3 range of bits can be used to identify IP-I or IP-C packet. In another approach the 'Option' provision in IP may be leveraged. Typically, the Option fields are used for control and debug. However, extensions may be possible for this purpose. These two types of packets are discussed below. This extension is applicable to the IP version 6 (IPv6) case. They both follow a Type-Length-Value (TLV) format, which can be encoded as follows.

As shown in Table 1, for IP-Interest (IP-I) PDU, the following option setting can be used to identify a packet as an IP-I PDU in IPv4. The following are the type-length-value (TLV) details of the Option field to identify an IP-I.

TABLE 1

| Filed | Size(b) | Setting |
| --- | --- | --- |
| Copied | 1 | 1 |
| Option Class | 2 | (based on standardization) |
| Option Number | 5 | (based on standardization) |
| Option Length | 8 | Variable based on Interest properties |
| Option Data | Variable | Interest specific attributes useful to the IP layer |

As shown in Table 2, the option data field can be used to indicate any interest specific attributes useful to the IP layer. For the IP-Content (IP-C) PDU, the option field setting would be similar to the IP-I option field, except that the 'Option Number' would be set to indicate a content packet, and the 'Option Data' would map to the attributes associated with the content object.

TABLE 2

| Filed | Size(b) | Setting |
| --- | --- | --- |
| Copied | 1 | 1 |
| Option Class | 2 | (based on standardization) |
| Option Number | 5 | (based on standardization) |
| Option Length | 8 | Variable based on Content properties |
| Option Data | Variable | Content specific attributes useful to the IP layer |

FIG. 1 is a block diagram of an IP based content router (IP-CR) 102 according to an embodiment. IP-CR 102 may comprise an IP packet classifier 104, an IP packet processor 106, a forwarding information based (FIB) engine 108, a protocol classifier 110, a plurality of application process components 118, 120, 122, 124, and a plurality of interfaces 150. The interfaces 150 may provide network connectivity to the IP-CR 102 to receive and transmit packets, and may also be referred to as ports. The interfaces 150 may be coupled to or include a transmitter (not shown) and/or a receiver (not shown). The protocol classifier 110 may comprise a transfer connect protocol (TCP) port classifier 112, a user datagram protocol (UDP) port classifier 114, and other port classifiers 116 for other types of protocols. Each application process component 118, 120, 122, 124 may comprise an application processing engine (APE) 126, an application pending interest table (A-PIT) 124, a content store engine 132, and an application content store (A-CS) 130. FIB engine 108 may comprise a forwarding table. FIB engine 108 may determine the proper interface 150 in IP-CR 102 to which an IP-packet should be sent for transmission.

IP-CR 102 may receive, process, and transmit three types of packets: IP packets 140, IP-I packets 142, and IP-C packets 144. IP packets 140 are traditional IP packets. IP-I packets 142 are IP interest packets requesting a content object from the network. IP-C packets 144 are IP content packets containing a content object that can be cached. IP-C packets 144 may be stored in the IP-CR's 102 cache by indexing the IP-C packets 144 to an application protocol layer's naming semantic. IP packets are received and forwarded by the IP-CR 102 according to well-known methods. IP-I 142 and IP-C 144 packets may be intercepted by the IP-CR 102 for application protocol level processing. Once intercepted, any type of service, such as content distribution or transformation, may be implemented. A domain name server (DNS) may be leveraged to set the IP destination address of IP-I 142 and IP-C 144 packets. The destination is the default fall back if the content cannot be found in the cache of the IP based content router 102 or in the cache of a nearby content router. IP based content router 102 may support one, several, or all application level protocols, such as, for example, Ethernet, IP, hypertext transfer protocol (HTTP), and real-time transport protocol (RTP).

IP Packet Classifier 104 identifies the IP-I and IP-C packets from the incoming IP traffic on the physical interfaces 150 shown on the lower left and right sides of IP-CR 102. IP-I and IP-C packets are forwarded to the protocol classifier 110 by IP packet classifier 104 and IP packet processor 106. The protocol classifier 110 classifies the IP packet based on the session level protocol, such as, TCP or UDP. Once the session level protocol is identified, the port classifier 112 hands that packet to the corresponding APE 126 for further processing based on the protocol.

The APE 126 implements logic to process application layer protocols protocol data units (PDUs). The PDUs may be HTTP, RTP, or any other application layer protocol PDUs. The APE 126 may collaborate with other APEs in other IP based content routers to implement services such as, distributive hash table (DHT) for content/location resolution, security services, collaborative caching, etc. The APE 126 carries out the application protocol layer functions including content dissemination logic, local caching, service point location redirection (i.e., late-binding by changing destination IP address), and complex application data manipulation, such as media processing based on the incoming IP-I or IP-C packet. More importantly, the APE 126 is aware of the naming semantics used by the application, hence APE 126 can interpret the name in an IP-I packet and respond to a request for content, if the APE 126 has the requested content in the APEs 126 local content store 130. At the same time, names from the IP-C packets may be used to index content in the content store 130 for future use. If the content is not found the APEs 126 local content store 130 and the content/service location has been changed due to information/service provider mobility, the destination locator (e.g., an IP address or a service attribute such as a name) may be updated before the packet is sent to FIB engine 108 to continue the forwarding process.

The A-CS 130 may cache the application layer payload obtained from an IP-C packet. The content may be stored in a data-structure that is indexed as a function of the content's name for later retrieval. The A-CS 130 may also store content hashed by naming semantic specific to the application layer protocol, uniform resource identifier (URI), or other fields of protocol fields of the header of a data packet.

A-PIT 124 usage may be optional, depending on the application. The A-PIT 124 may aggregate demand, thereby preventing multiple IP-I packets 142 from being forwarded to upstream IP based content routers or to the server. In an embodiment, the A-PIT 124 is enabled in the edge routers for reverse-path multicasting for non-cached content. End-to-end PIT usage may require symmetric forwarding between entry and exit points in the network using, for example, OpenFlow. In an embodiment, A-PIT 124 may be a stateful A-PIT, which keeps a list of incoming interests seeking the same content to enable end-to-end A-PIT. In such an embodiment, the destination forwarding for IP-C packets 144 may be overridden by local information stored in the A-PIT 124. The A-PIT 124 may also mitigate distributed denial of service (DDoS) issues by actively monitoring user requests.

The A-PIT 124 aggregates content requests in the A-PIT 124 before the content is available for serving. Here, aggregation could be end-to-end as long as IP routing can guarantee symmetric routing between two points (e.g., mostly the entry and exit points in the network). IP routing in general may not enable this feature, but could do so under frameworks like OpenFlow. Aggregating the demand may require keeping state for the hosts seeking content before the content has arrived from the upstream router. This feature ensures that only one request is forwarded to the content source, thereby reducing the burden on the server. When the IP-C router 102 receives a response, the corresponding APE 126 checks the A-PIT 124 to find other users who've requested the content, create more copies of the content and unicast the content to the each of the end points. Further, the APE 126 can decide to cache the content based on the content policies. The A-PIT 124 may also serve as a defense again distributed denial of service (DDoS) attacks considering that the APE 126 can be equipped with logic for keeping track of traffic for each prefix and for terminating the IP-I packet when the APE 126 notices a surge in requests for a given content or service. The A-PIT 124 can be implemented at every content router, especially at IP routing aggregation routers (access or backbone).

The IP-packet processor 106 may perform IP processing functions off-loaded from the APE 126, if required. This may be done by submitting the payload and the encoded instructions about the actions, such as, for example, swapping IP addresses or creating multiple copies of the IP packet, etc., before processing it through the FIB 108.

In IP, content oriented applications work with names of content originating hosts and the content itself. Content naming may be application specific. Although URI based approach is the most popular one, there is no common format used by content providers, such as NetFlix or Google, for each content objects of a given content. Most of the content today is delivered over HTTP. The initial request for the manifest of the content may follow a URI format of file://<location>/<content>, which resolves to a server, that provides the meta-data of the content. Then, the application protocol enables client-server interaction through standardized actions such as Get and Post enabling the content delivered to the end user.

Applications may be enabled to leverage the proposed network functions. The new proposed extensions to IP shall expedite content delivery while improving network efficiency. Applications leverage application layer protocols such as HTTP, RTP, etc. with its own naming semantics through which applications can convey several content requirements and streaming logic. Sockets are a standard abstraction for application layer protocols to leverage the functionality of the lower session and network layer. New socket abstractions can be realized that would allow applications to generate IP-I and IP-C packets to the network to execute the content delivery logic through an IP-CR 102.

Figure 2:
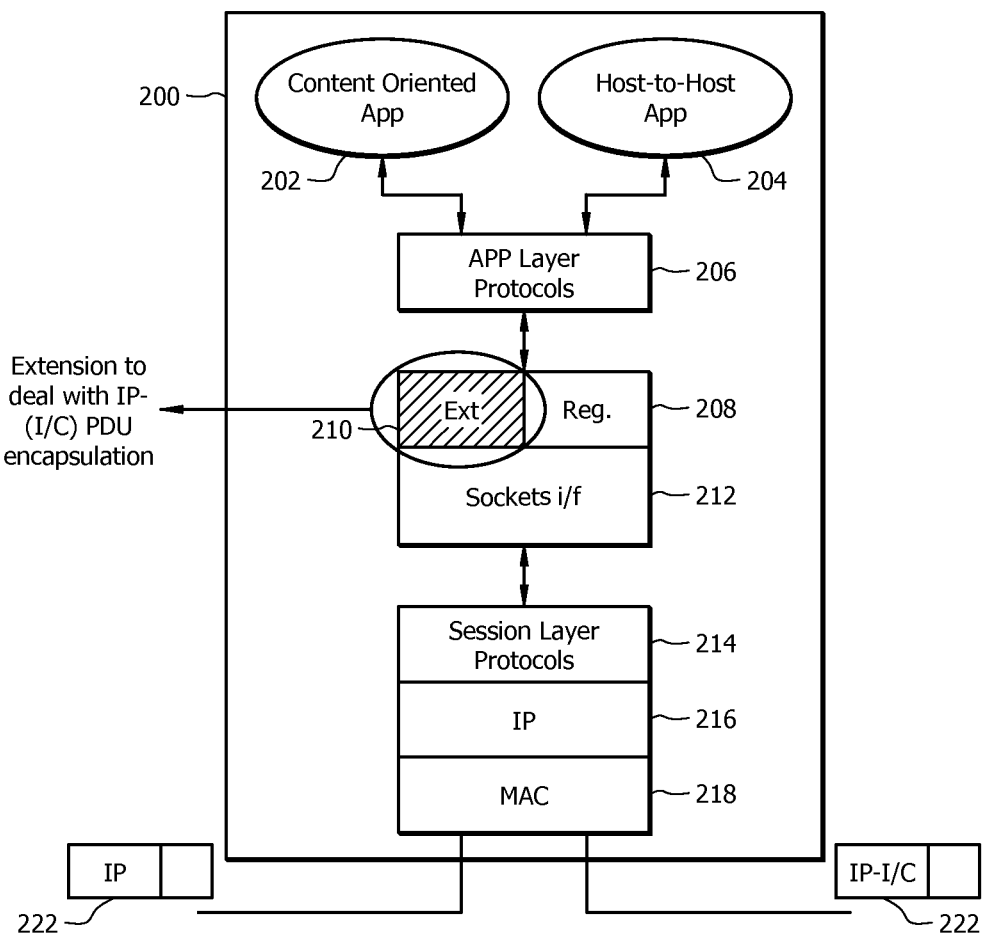
FIG. 2 is a block diagram illustrating an exemplary IP-I or IP-C packet protocol stack according to an embodiment of the disclosure.

FIG. 2 is a block diagram illustrating an exemplary IP-I or IP-C packet protocol stack 200 according to an embodiment of the disclosure. The IP packet protocol stack 200 may have extensions to allow application layer protocols (field 206) to take advantage of the IP-CRs. This can be realized at end hosts with simple extensions to the socket i/f. With this extension the application level protocols have a choice to work with either the standard socket interface shown as Reg. Regular field 208, or extended sockets which support IP-I/C marking shown as Ext (field 210). The interest/content (I/C) extension field 210 may provide an indication of whether the packet is an IP-I/C packet 220 (i.e., an IP-I packet or an IP-C packet) or an IP packet 222. I/C extension field 210 may comprise one or more bits used to indicate the type of packet.

Considering IP-CR nodes terminates IP-I or IP-C packets has implication on the session level protocol between the end hosts. If the content is requested and delivered over UDP, the proposed IP extensions can be implemented with relative ease, considering UDP's stateless property. In the case of TCP, the session would have to be terminated at a proxy managed at the IP-CR or another dedicated router, which can then translate the TCP session packets (could be filtered further on application type) into IP-I interest requests destined to the original server. If the original server serves content only over TCP and the server end infrastructure doesn't support IP-CR nodes, then another layer of adaptation may be required from the domain's exit point to the original server so that the content can be retrieved over TCP cached in the network for later retrieval.

Content Object and IP level maximum transmission unit (MTU) mismatch may be a challenge even for the ICN proposals. The possible solutions here are as follows. First, the media layer may adapt the media layer's content object size to what IP can handle, and name it accordingly, so that the IP-CR nodes can cache and serve the content without any concern for fragmentation and reassembly. Second, an adaptation layer can be introduced between the application protocol and the IP layer (similar to TCP) per hop so that logic in the APE can segment and reassemble these chunks based on IP transport requirements before caching the content in the IP-CR's content store.

Applications that use protocols working in a PULL mode should be able to leverage the proposals in this disclosure to improve the overall quality of mobility service. For such applications, the combination of network caching and ability of the application to express data by name can help reduce packet losses during the transition. For instance, in Mobile-IP protocols that rely on local re-direction and tunneling techniques, the home-agent can be signaled about the move, during which the IP-CR can cache the content. After the handoff, the content can be retrieved by signaling between the mobile/proxy agent and the home agent. For applications that work in a PUSH model, one approach would be to flip the PULL model of working between the re-direction point and the mobile node's current anchor point to help retrieve the cached content, and then move on the default PUSH model of working.

The disclosed IP-CR architecture enables imposing various levels of security policies related to authentication, content verification, trust and privacy. At a low level, security constructs mentioned in V. Jacobson et al (PARC), "Networking named content", CoNext, 2009, which is incorporated herein by reference as if reproduced in its entirety, can be deployed, and are able to verify the integrity of every content object received by the receiver. Such per-PDU signature logic also follows from other ICN architecture proposals. As mentioned earlier, application logic in the router is flexible to incorporate this or other security policies based on the application's requirement.

Inter-domain routing or forwarding mechanism should not be affected by the disclosed methods, systems, and apparatuses, as one objective is to serve content from the local domain, irrespective of the other domains from which the content may arrive. In doing so, such issues may have to be dealt with later considering the economic incentives involved in content delivery.

These proposals can also be realized in an software defined networking (SDN) framework as long as the transport layer switches can logically implement the router architecture presented in this invention.

The disclosed IP-CR, method, and system may support static content. Such content is placed in the network based on certain requirements from the provider's perspective. In this case the incoming IP-I packets have to be resolved to one or more locations in the network where the content exists. This can be implemented using an overlaid <key,value> indexing logic, such as DHT implemented as part of the APE. In this case, the incoming IP-I packet at the entry point of the IP-C domain may be able to resolve the corresponding content to specific locations in the network.

Integrated IP routing protocol may also be supported. IP-CR router may implement extended open shortest path first/border gateway protocol (OSPF/BGP) routing protocol for automatic topology discovery in a scenario where the deployment may only be limited to the edges and also perform content level optimization by enabling interaction between the IP-CR routers in the network.

IP-CR nodes can be deployed in an incremental manner beginning from the edge enabling content multicast from the network edge. More content delivery efficiency shall be gained by converting more of the core routers to enable IP-CR functionalities. The content dissemination logic can also work in an overlaid model, wherein the IP-CR nodes could collaborate among themselves to achieve content routing and delivery to the users; in this case, the underlay IP or other transport such as MPLS would play the role of a transport network.

Figure 3:
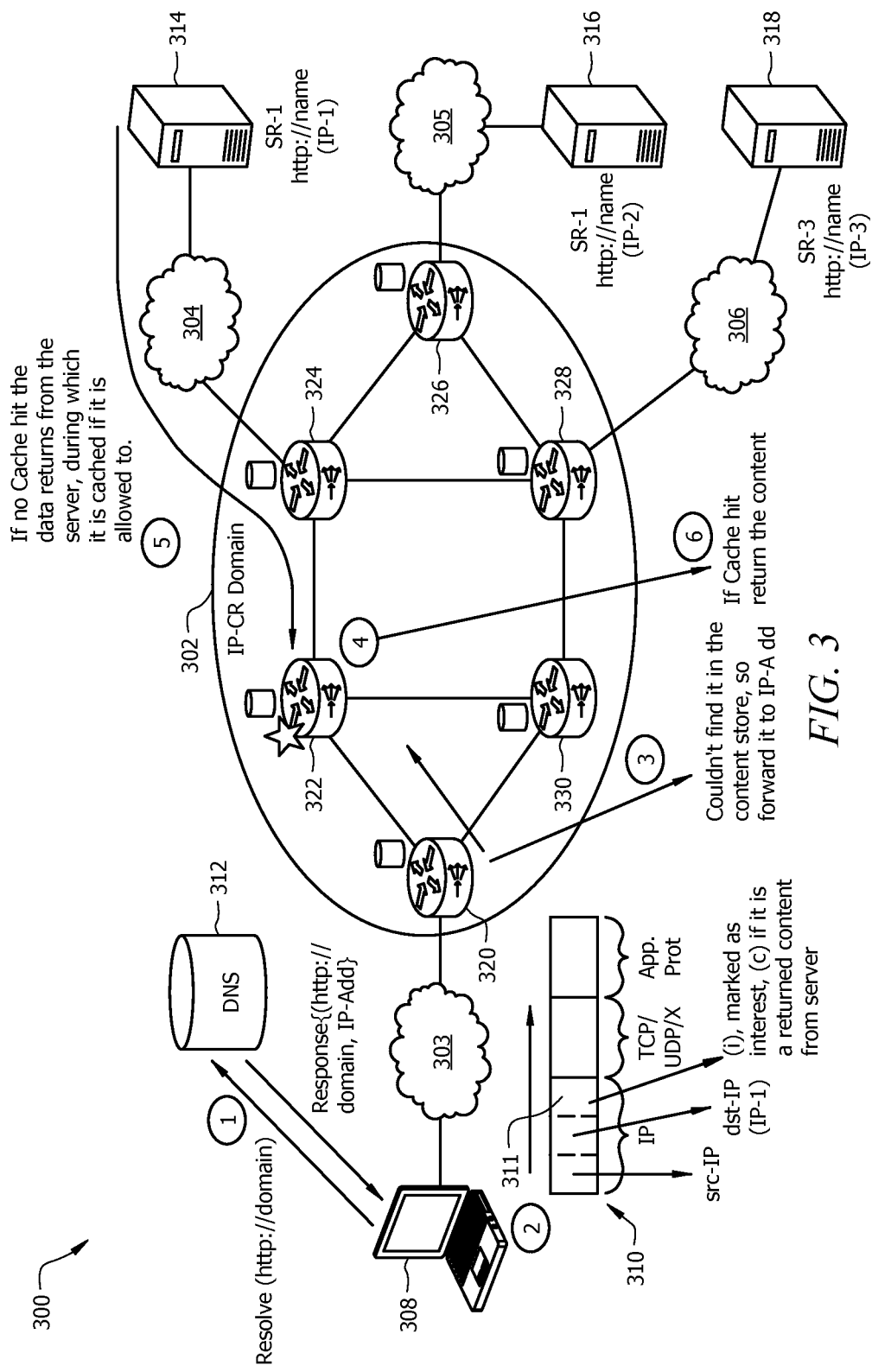
FIG. 3 is a schematic diagram of a system in which IP based content routing may be implemented according to an embodiment of the disclosure.

FIG. 3 is a schematic diagram of a system 300 in which IP based content routing may be implemented according to an embodiment of the disclosure. System 300 may comprise an IP-CR domain 302, a client 308, a plurality of servers 314, 316, 318, a plurality of other domains 303-306, and a DNS server 312. The IP-CR domain 302 may comprise a plurality of IP-CRs 320, 322, 324, 326, 328, 330.

FIG. 3 shows a process of obtaining content, with the steps to the process shown in circled numbers. When a client 308 desires content, the client 308 consults a DNS 312 in step 1 to resolve the domain, and receives a response with an IP address from the DNS 312. In step 2, the client 308 sends an IP-I packet 310 to network 303. The IP-I packet 310 may comprise a plurality of fields including a packet type field 311 that indicates that the packet is an interest packet. The IP-I packet 310 may also comprise content metadata information, the number of chunks, segment duration, bit rate encoding, etc., as well as traditional IP packet fields. The IP-I packet may set the IP destination address as the original server 314 IP address as this will be the fallback if there is no cached content in the network 302. The IP-I packet 310 is then forwarded to IP-CR 320.

At step 3, the "interest" IP-I packet 310 hits an IP-CR domain 302, and the IP-I packet 310 may be processed by an appropriate APE. The application (APP) protocol header in IP-CR 320, which conveys the name, searches the content store to determine whether the content is contained within the content store and can be fetched. If the content is found, then the APP protocol header is framed with an appropriate response, the IP destination is set to the source in the IP-I header and the IP packet is sent to the requesting client 308. If the content is not found in the IP-CR 310, the content can be matched against the APE's PIT to see if any previous user has requested this content. If so, the source of the host is recorded and the IP-CR 310 waits for the response from the upstream router. If this is the first user to request the content, an entry is created in the PIT for the content name, and the packet is forwarded to the original server 314. If the target content/service location has been changed due to the mobility, the destination locator (e.g., an IP address) might be updated, based on the policy, before sending to FIB to continue the forwarding process, this enables the late-binding feature.

At step 4, the same processing as in step 3 may be performed at the upstream IP-CRs 322, 324. In step 5, at the server, the content packet may originate from the source as an IP-C PDUs. When the content data flows through an IP-CR, the PDU may be hashed against its APP protocol content object name and copied to its content store. In this way, the IP-CRs described herein know that the IP packet comprises data. A single bit may be used to convey whether the IP packet is an "interest" or a "content" packet.

At step 6, the IP-C packet (not shown) reaches an IP-CR, such as IP-CR 322. The IP-CR then searches the PIT to see if there are any previous requests for the same content. If so, the APE then creates multiple copies for the content and unicasts it to each requesting source. If not, the APP packet may be cached and forwarded to the requesting source.

Figure 4:
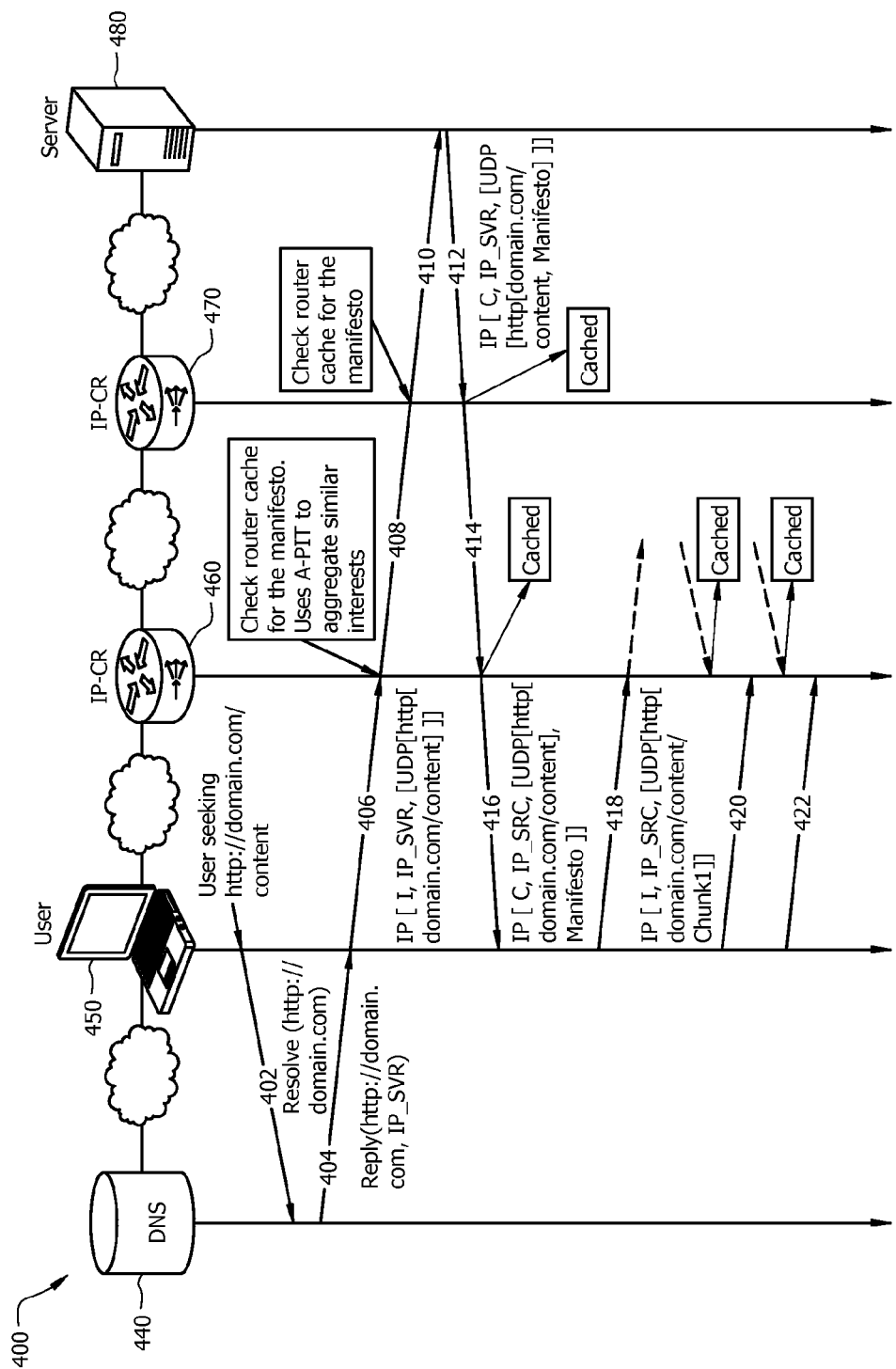
FIG. 4 is a protocol diagram illustrating a method for a host to fetch content from an IP-CR domain according to an embodiment of the disclosure.

FIG. 4 is a protocol diagram illustrating a method 400 for a host to fetch content from an IP-CR domain according to an embodiment of the disclosure. At step 402, a user 450 seeking content from a domain http://domain.com/content may send a message to the DNS 440 seeking to resolve http://domain.com. At step 404, the DNS 440 may return a reply message to the user 450 that includes the IP address for http://domain.com. At step 406, the user 450 may then send a message with a packet to IP-CR 460. The IP-CR 460 may inspect the packet to determine the packet type, check a router cache for the manifesto (the manifesto may contain metadata about the content that has been requested, thereby allowing the receiver to name and request the rest of the content appropriately), and may use an A-PIT to aggregate similar interests. If the content is not found in the router cache for IP-CR 460, then at step 408 the IP-CR 460 may forward the packet to IP-CR 470. The IP-CR 470 may inspect the packet for packet type and may check the IP-CR 470 router cache for the manifesto. If the content is not found, at step 410 the IP-CR 470 may forward the packet to server 480.

Server 480 may retrieve the requested content and, at step 412, forward a packet containing the requested content to IP-CR 470. The packet forwarded to IP-CR 470 from server 480 may comprise a packet type field indicating that the packet comprises content. Upon receiving the packet from server 480, IP-CR 470 may store or cache the content in its content store and then, at step 414 forward the packet to IP-CR 460. Upon receiving the packet, IP-CR 460 may store or cache the content in its content store (if authorized by the content owner). After caching the content, IP-CR 460 may forward the return packet user 450. User 450 may send other interest packets to IP-CR 460 in steps 418, 420, 422. IP-CR 460 may then process the interest packets in a similar manner as described above. If the IP-CR 460 has the content in its content store, then the IP-CR 460 may retrieve the content from the IP-CR's 460 content store and provide the content to the user 450. Otherwise, the IP-CR 460 may forward the remaining interest packets to IP-CR 470 and possibly server 480, where the content may be retrieved and returned to the user 450. IP-CRs 460, 470 may cache the return content in their content stores as the content is forwarded to the user 450.

Figure 5:
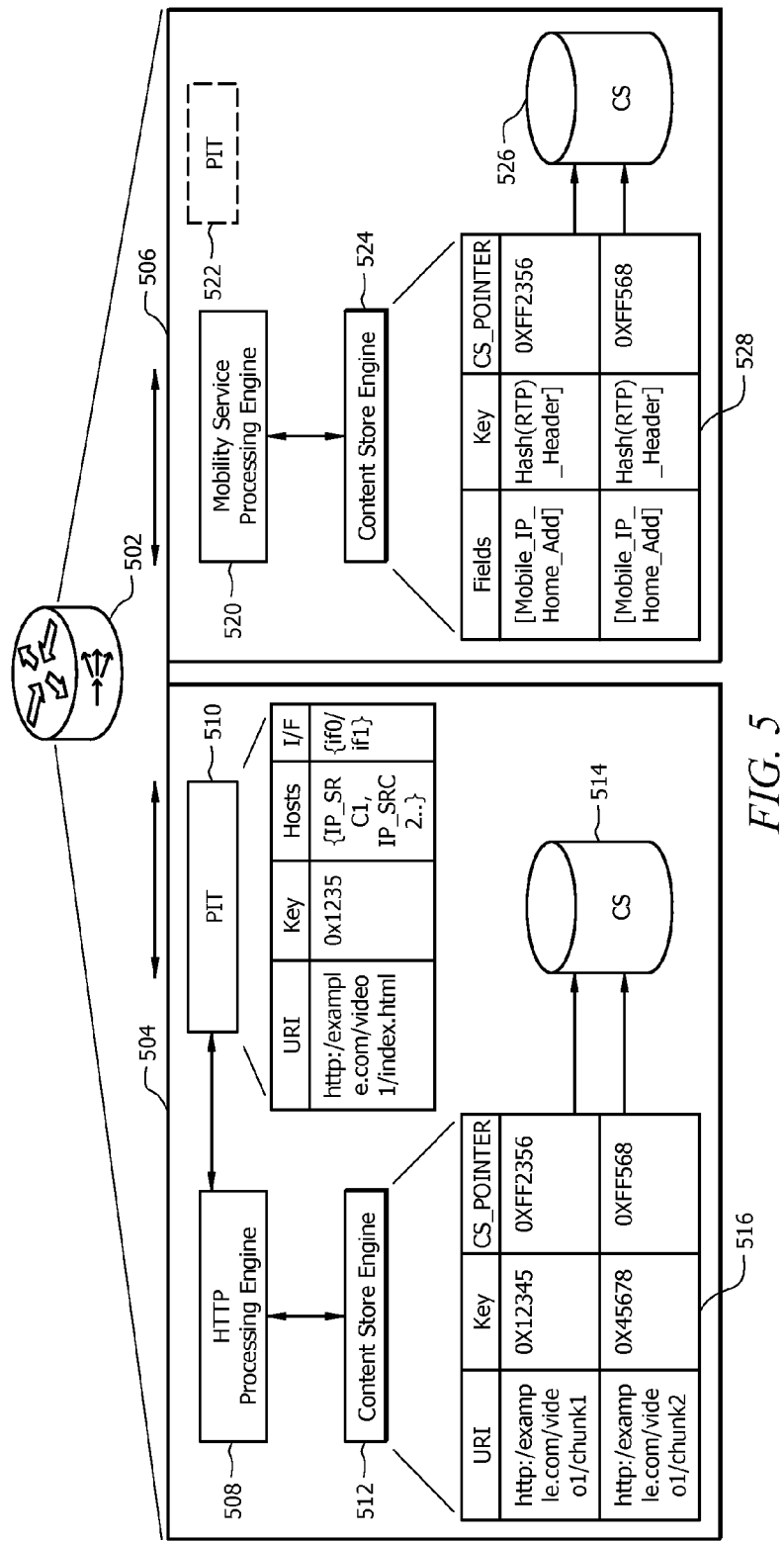
FIG. 5 is a schematic diagram of an IP-CR according to an embodiment of the disclosure.

FIG. 5 is a schematic diagram of an IP-CR 502 according to an embodiment of the disclosure. IP-CR 502 may comprise an HTTP processing unit 504 and a mobility service processing unit 506. HTTP processing unit 504 may comprise an HTTP processing engine 508, a PIT 510, a content store engine 512, and a content store 514. Content store 514 may comprise cached content. Content store 514 may also comprise a table 516 with names (e.g., URIs), keys, and associated pointers to where the content is located within the content store 514. HTTP processing unit 504 may enable packet level local caching/content multicasting, manage flash crowd scenarios, and aggregate user interests, thereby reducing multiple flows before local caching. HTTP processing engine 508 may determine the type of IP packet (e.g., IP-C or IP-I) of incoming packets. PIT 510 may comprise entries containing the names of interests (i.e., content names) and a set of interfaces from which the matching interests have been received. When an IP-I packet arrives at the IP-CR 502, the HTTP processing engine 508 may find the matching PIT and forward the IP-I packet to one or more of the interfaces listed in the PIT entry if the content is not found in the content store 514. The content store engine 512 may communicate with the HTTP processing engine 508 and may determine whether the content associated with an IP-I packet is contained within the content store 514. Additionally, the content store engine 512 may store content from IP-C packets in content store 514.

Mobility service processing unit 506 may comprise a mobility service processing engine 520, a PIT 522, a content store engine 524, and a content store 526. This feature can be applied when a mobile node is handing-off from one point-of-attachment to another. Content store 526 may comprise cached content. Content store 526 may also comprise a table 528 with names (e.g., URIs), keys, and associated pointers to where the content is located within the content store 526. PIT 522 may comprise entries containing the names of interests (i.e., content names) and a set of interfaces from which the matching interests have been received, and is waiting for data arrival. A conversation between two or many mobile nodes can be, which normally is conducted in a sender-oriented manner can locally be switched, i.e. in the context of the attached PoA or the one being hand-offered to the PULL mode of operation. This requires the temporary home agent to inject appropriate rules in the IP packet processing engine to save the data as part of the mobility service engine. When an IP-I packet from a mobile device arrives at the IP-CR 502, the mobility service engine 520 at the new PoA after the handoff, the data can be retrieved based on the naming semantics of the application layer protocol used in the conversation session. The content store engine 524 may communicate with the mobility service engine 520 and may determine whether the content associated with an IP-I packet is contained within the content store 526. Additionally, the content store engine 524 may store content from IP-C packets in content store 526. Current IP suffers from packet losses during mobility. IP-I and IP-C may be used to achieve loss less handover of a mobile client (e.g., mobile phone, tablet computer, etc.) by caching the content in content store 526 and later retrieving content at aggregation points. The mobility service processing unit 506 may be configured, with the aid or appropriate signaling, to flip between a sender and receiver oriented mode during handoff of a conversational session, to leverage the cache capabilities of the IP-CR 502, when the IP-CR 502 also serves as a PoA.

Figure 6:
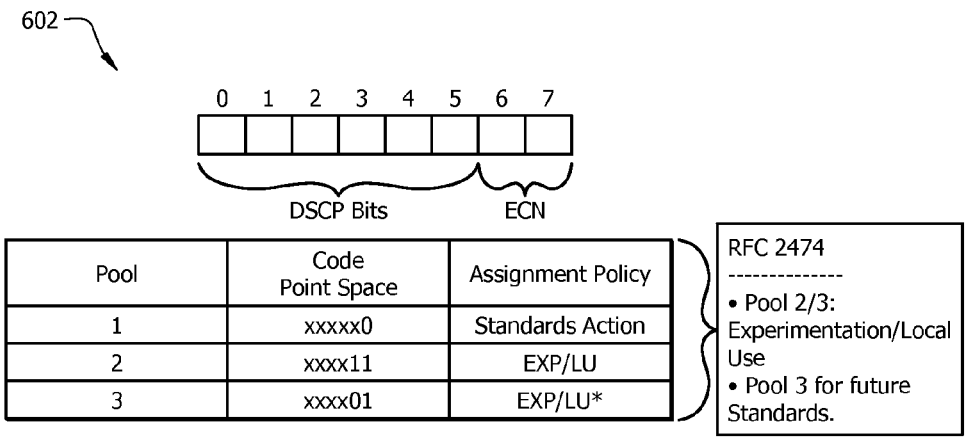
FIG. 6 is a schematic diagram of a portion of a header of an IP packet 602 according to an embodiment of the disclosure.

FIG. 6 is a schematic diagram of a ToS field of an IP packet 602 according to an embodiment of the disclosure. IP packet 602 may comprise a Differentiated Services Code Point (DSCP) field. The DSCP field may comprise a plurality of DSCP bits and a plurality of explicit congestion notification (ECN) bits. The DSCP bits may comprise about 6 bits and may be bits 0-5 in an embodiment. The ECN bits may comprise about 2 bits and may be bits 6 and 7 in an embodiment. DSCP identifies different traffic classes subjected to prioritized per-hop behavior. Pool 3 may be used to mark IP-I and IP-C packets, further the DSCP comprises enough space to represent application level protocols in the bit space, e.g., only HTTP/RTP based content oriented traffic may be intercepted. The Type of Service (ToS) byte in IPv4 has been redefined in IPv4 as DSCP+ECN bits. IPv6 preserves the ToS byte from IPv4, so the same interpretation for using pool 3 to mark IP-I and IP-C packets may apply.

In IPv4, the "option" setting may also be used to identify a packet as an IP-I PDU as shown in Table 3 below.

TABLE 3

IP-Interest/Content PDU

| Field | Size(b) | Setting |
| --- | --- | --- |
| Copied | 1 | 1 |
| Option Class | 2 | 1 or 3 (Could use a new Class for this type of IP packets) |
| Option Number | 5 | 1/2 (for interest/content) |
| Option Length | 8 | Variable based on Interest properties |
| Option Data | Variable | Interest specific attributes useful to the IP layer |

In IPv6, the "Next-Header" feature may be leveraged to identify a packet as an IP-I or IP-C. The "Next-Header" feature of IPv6 encodes an "Options" in a Type-length-value (TLV) format.

Figure 7:
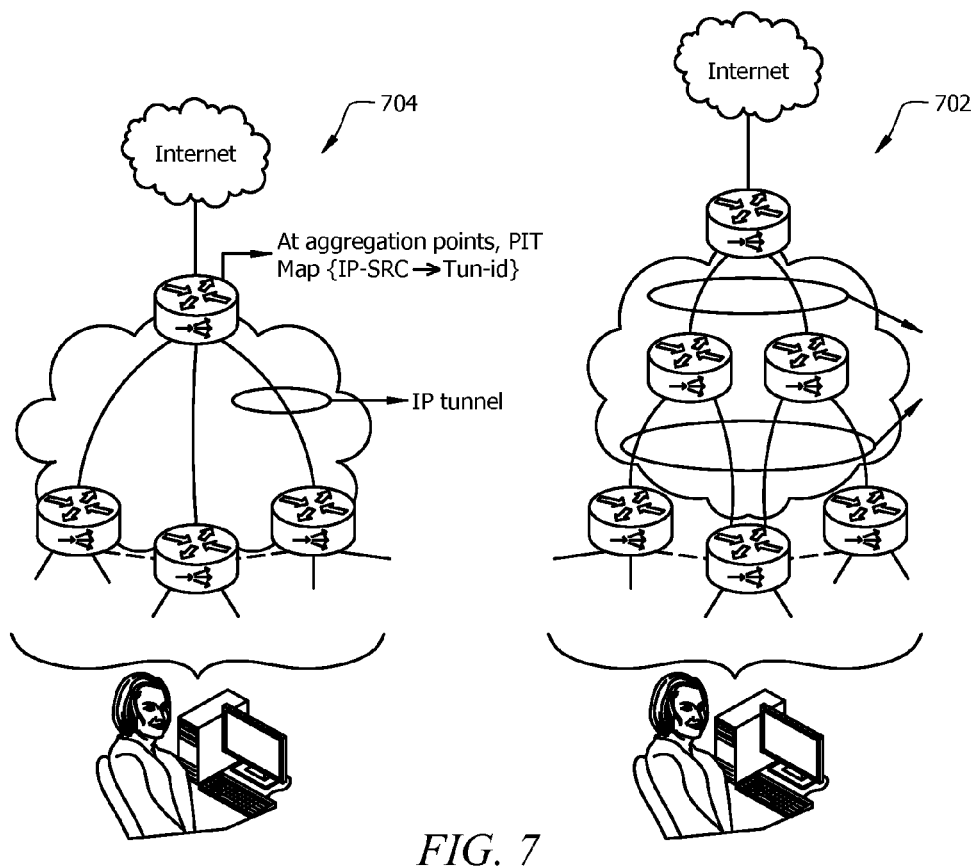
FIG. 7 is a schematic diagram illustrating methods for ensuring symmetrical paths for content multicasting according to an embodiment of the disclosure.

FIG. 7 is a schematic diagram illustrating methods for ensuring symmetrical paths for multicast traffic according to an embodiment of the disclosure. IP routing is not symmetrical. However, a multicast tree built by using a PIT should ensure content takes the same path back along the tree built by the IP-I PDUs. Two options may ensure symmetrical paths for multicast traffic. Option one 702 constructs flow paths using OpenFlow (OF) so that the paths are symmetrical. Option two 704 provides that tunnels are created between the content routers with mapping between the IP-Src (IP source) and incoming tunnel so that the IP-C packet can be correctly mapped back to the tunnel.

Tunnels may be based on generic routing encapsulation (GRE). The mapping from the IP-I and IP-C packet may be mapped to the outer GRE header to enable proper handling of these PDUs at the tunnel end points. The protocol header may be 2 B and should be sufficient to indicate IP-I and IP-C packets. The tunnels may be configured to forward only content oriented IP traffic. These techniques may be particularly necessary when IP-CRs are deployed in an incremental manner in a providers' network.

Figure 8:
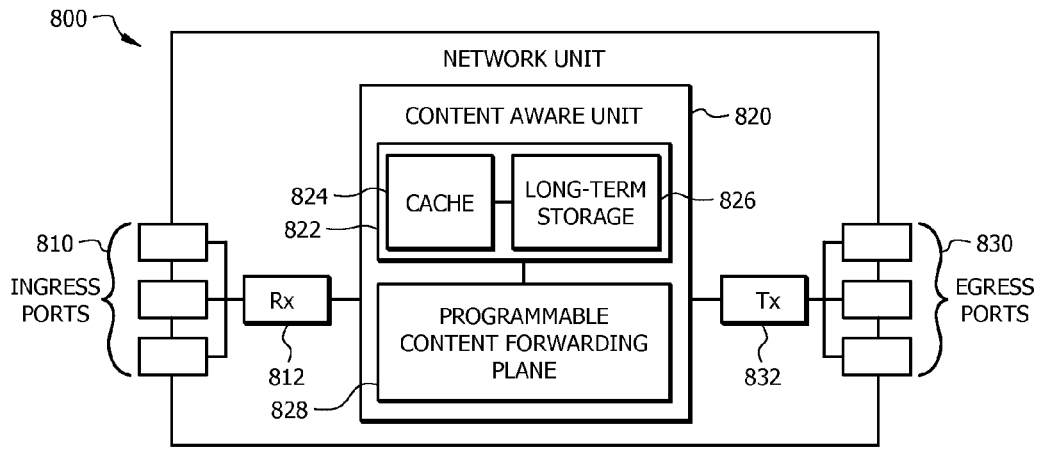
FIG. 8 is a schematic diagram of an embodiment of a content aware network unit.

FIG. 8 illustrates an embodiment of a network unit 800, which may be any device that transports and processes data through a network. For instance, the network unit 800 may be located in IP-CR 102, IP-CR 502 or any node in the IP-CR domain 302, or any node in the schemes described above. The network unit 800 (i.e., content router) may also be configured to implement or support the IP based content-centric routing and methods described above. The network unit 800 may comprise one or more ingress ports or units 810 coupled to a receiver (RX) 812 for receiving signals and frames/data from other network components. The network unit 800 may comprise a content aware unit 820 to determine which network components to send content to. The content aware unit 820 may be implemented using hardware, software, or both. The network unit 800 may also comprise one or more egress ports or units 830 coupled to a transmitter (TX) 832 for transmitting signals and frames/data to the other network components. The receiver 812, content aware unit 820, and transmitter 832 may also be configured to implement at least some of the disclosed schemes and methods, which may be based on hardware, software, or both. The components of the network unit 800 may be arranged as shown in FIG. 8.

The content aware unit 820 may also comprise a programmable content forwarding plane block 828 and one or more storage blocks 822 that may be coupled to the programmable content forwarding plane block 828. The programmable content forwarding plane block 828 may be configured to implement content forwarding and processing functions, such as at an application layer or L3, where the content may be forwarded based on content name or prefix and possibly other content related information that maps the content to network traffic. Such mapping information may be maintained in a content table at the content aware unit 820 or the network unit 800. The programmable content forwarding plane block 828 may interpret user requests for content and accordingly fetch content, e.g., based on meta-data and/or content name, from the network or other content routers and may store the content, e.g., temporarily, in the storage blocks 822. The programmable content forwarding plane block 828 may then forward the cached content to the user. The programmable content forwarding plane block 828 may be implemented using software, hardware, or both and may operate above the IP layer or L2. The storage blocks 822 may comprise a cache 824 for temporarily storing content, such as content that is requested by a subscriber. Additionally, the storage blocks 822 may comprise a long-term storage 826 for storing content relatively longer, such as content submitted by a publisher. For instance, the cache 824 and the long-term storage 826 may include Dynamic random-access memories (DRAMs), solid-state drives (SSDs), hard disks, or combinations thereof.

Figure 9:
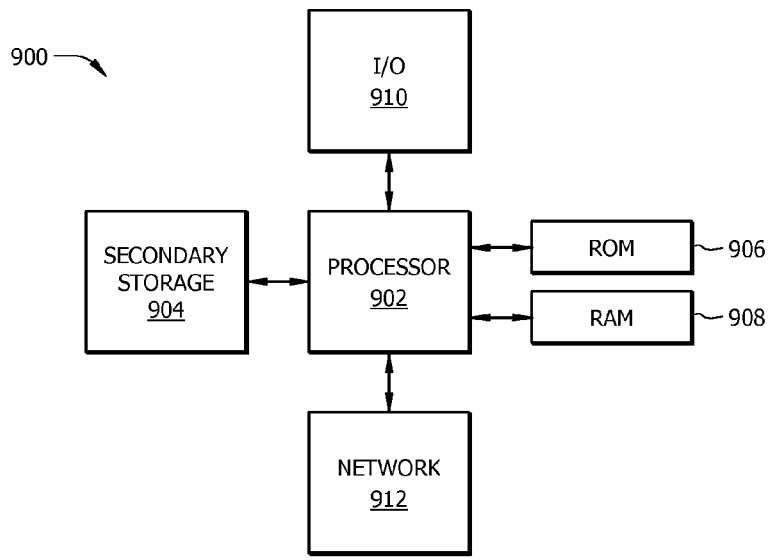
FIG. 9 illustrates a typical, general-purpose network component suitable for implementing one or more embodiments of the components disclosed herein.

The network components and devices described above may be implemented on any general-purpose network component, such as a computer or network component with sufficient processing power, memory resources, and network throughput capability to handle the necessary workload placed upon it. FIG. 9 illustrates a typical, general-purpose network component 900 suitable for implementing one or more embodiments of the components disclosed herein. The network component 900 includes a processor 902 (which may be referred to as a central processor unit or CPU) that is in communication with memory devices including secondary storage 904, read only memory (ROM) 906, random access memory (RAM) 908, input/output (I/O) devices 910, and network connectivity devices 912. The processor 902 may be implemented as one or more CPU chips, or may be part of one or more application-specific integrated circuits (ASICs) or digital signal processors (DSPs).

The secondary storage 904 is typically comprised of one or more disk drives or tape drives and is used for non-volatile storage of data and as an over-flow data storage device if RAM 908 is not large enough to hold all working data. Secondary storage 904 may be used to store programs that are loaded into RAM 908 when such programs are selected for execution. The ROM 906 is used to store instructions and perhaps data that are read during program execution. ROM 906 is a non-volatile memory device that typically has a small memory capacity relative to the larger memory capacity of secondary storage 904. The RAM 908 is used to store volatile data and perhaps to store instructions. Access to both ROM 906 and RAM 908 is typically faster than to secondary storage 904.

At least one embodiment is disclosed and variations, combinations, and/or modifications of the embodiment(s) and/or features of the embodiment(s) made by a person having ordinary skill in the art are within the scope of the disclosure.

Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term about means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An internet protocol (IP) content router, comprising:
a forwarding information base (FIB) engine comprising a data store comprising forwarding instructions;
an IP packet classifier comprising a processor configured to classify a first incoming IP packet as an information centric networking (ICN) packet and a second incoming IP packet as a non-ICN packet;
an IP packet processor comprising a processor, wherein the IP packet processor is coupled to the FIB engine and to the IP packet classifier, wherein the IP packet processor is configured to:
intercept the ICN packet for further ICN processing in the IP content router;
consult the FIB engine for forwarding instructions for the non-ICN packet; and
forward the non-ICN packet according to the forwarding instructions;
an IP protocol classifier coupled to the IP packet classifier, wherein the IP protocol classifier is configured to classify the ICN packet based on an identity of one of a plurality of session level protocols; and
a plurality of application processing engines (APEs) coupled to the protocol classifier,
wherein each of the APEs corresponds to a session level protocol, and
wherein each of the APEs is configured to interpret a name in an IP interest (IP-I) packet and respond to a request for content if the content is contained within an application content store.

2. The IP content router of claim 1, wherein the ICN packet is one of an IP interest (IP-I) packet and an IP content (IP-C) packet.

3. The IP content router of claim 1, wherein the session level protocols comprise a transport connect protocol (TCP) and a user datagram protocol (UDP).

4. The IP content router of claim 1, wherein the APEs are further configured to update a destination locator before the IP-I packet is sent to the FIB to continue the forwarding process if the content is not found and content/service location has been changed due to information/service provider mobility.

5. The IP content router of claim 4, wherein the destination locator is encoded in the ICN packet, wherein the ICN packet is an IP content (IP-C) packet, wherein the destination locator comprises one of a destination IP address, a service attribute, and a name, and wherein the APEs update the destination locator by updating locator information in the ICN packet.

6. The IP content router of claim 1, further comprising a plurality of application processing engines (APEs) coupled to the protocol classifier, wherein each of the APEs is configured to store content from an IP content (IP-C) packet in the application content store and to index the content from the IP-C packet in the application content store based on a name of the IP-C packet.

7. The IP content router of claim 1, further comprising a port classifier coupled to the APEs, wherein the port classifier is configured to transmit the IP-I packet and the IP-C packet to the corresponding APE for further processing based on a protocol number once the session level protocol is identified.

8. The IP content router of claim 1, further comprising, an application specific pending interest table (A-PIT) for each of the APES, wherein the A-PITs are configured to aggregate content requests in a pending interest table before the content is available for serving, wherein aggregating the content requests comprises keeping a state for the hosts seeking content before the content has arrived from an upstream router.

9. The IP content router of claim 1, further comprising, a content store configured for each of the APEs, wherein the content store is configured to cache an application layer payload obtained from an IP-C packet, wherein the content is stored in a data-structure that is indexed as a function of a name of the IP-C packet.

10. The IP content router of claim 1, further comprising an IP packet processor coupled to the IP packet classifier, wherein the IP packet processor is configured to perform IP processing functions off-loaded from one of the APEs, and wherein the IP packet processor is configured to receive a payload and encoded instructions about actions.

11. The IP content router of claim 1, further comprising a mobility service processing unit coupled to the protocol classifier, wherein the mobility service processing unit is configured to cache IP interest (IP-I) and IP content (IP-C) packets to achieve loss less handover of a mobile client.

12. A method for forwarding packets in a network, comprising:
receiving at a router an internet protocol (IP) packet from a network node;
determining, with a processor, a classification of the IP packet, wherein the classification comprises one of an information centric networking (ICN) packet and a non-ICN packet;
performing application protocol level processing on the IP packet when the IP packet is determined to be an ICN packet;
classifying the ICN packet based on an identity of a session level protocol associated with the ICN packet;
forwarding the ICN packet to an application processing engine (APE) corresponding to the session level protocol associated with the ICN packet;
determining that the ICN packet is an IP interest (IP-I) packet;
interpreting, by the APE, a name of the IP-I packet; and
responding, by the APE, to a request for content encoded in the IP-I packet when content responsive to the request is contained within an application content store.

13. The method of claim 12, further comprising:
storing content from an IP content (IP-C) packet in the application content store; and
indexing the content from the IP-C packet in the application content store based on a name in the IP-C packet.

14. An apparatus for routing information centric networking (ICN) content in an internet protocol (IP) based networking environment, comprising:
a plurality of interfaces;
at least one memory comprising an application content store; and
at least one processor coupled to the memory and the interfaces, wherein the at least one processor is configured to implement:
an IP packet classifier coupled to the interfaces, wherein the IP packet classifier is configured to identify IP interest (IP-I) packets and IP content (IP-C) packets from incoming IP traffic on the plurality of interfaces;
an IP protocol classifier coupled to the IP packet classifier, wherein the IP protocol classifier is configured to classify the IP-I packets and the IP-C packets based on an identity of one of a plurality of session level protocols; and
a plurality of application processing engines (APEs) coupled to the IP protocol classifier, wherein each of the APEs corresponds to a corresponding session level protocol, wherein each of the APEs is configured to:
interpret a name in an IP-I packet;
respond to a request for content if the content is contained within the application content store;
store content from the IP-C packet in the application content store; and
index the content from the IP-C packet in the application content store based on a name of the IP-C packet.

15. The apparatus of claim 14, wherein the at least one processor is further configured to implement a port classifier configured to transmit one of the IP-I packets and the IP-C packets to the corresponding one of the plurality of APEs for further processing based on a protocol number once the session level protocol is identified.

16. The apparatus of claim 14, wherein the at least one memory and the at least one processor are further configured to implement an application specific pending interest table (A-PIT) for each of the APEs, wherein the A-PITs are configured to aggregate content requests in a pending interest table before the content is available for serving, and wherein aggregating the content requests comprises keeping a state for the hosts seeking content before the content has arrived from an upstream router.

17. The apparatus of claim 16, wherein the application content store comprises a content store for each of the APEs, wherein the content stores are each configured to cache an application layer payload obtained from an IP-C packet, and wherein the content is stored in a data-structure that is indexed as a function of a name of the IP-C packet.

18. The IP content router of claim 1, wherein classifying the first incoming IP packet as an ICN packet comprises:
examining a Type of Service (ToS) field in the IP packet; and
classifying the IP packet as an ICN packet when an option number field of the ToS field is set to indicate the IP packet is an interest packet or a content packet.

19. The method of claim 12, wherein determining a classification of the IP packet comprises:
examining a Type of Service (ToS) field in the IP packet; and
classifying the IP packet as an ICN packet when an option number field of the ToS field is set to indicate the IP packet is an interest packet or a content packet.

20. The apparatus of claim 14, wherein identifying IP-I packets and IP-C packets comprises:
examining a Type of Service (ToS) field for each packet in the incoming IP traffic; and
classifying each packet as an ICN packet when an option number field of the ToS field is set to indicate the IP packet is an interest packet or a content packet.

* * * * *